United States Patent [19]

Mohajer et al.

[11] Patent Number: 4,929,715
[45] Date of Patent: May 29, 1990

[54] REDUCTION OF CARBOXYL END GROUPS IN POLYESTER WITH DILACTIM ETHERS

[75] Inventors: Yousef Mohajer, Midlothian; Stanley D. Lazarus, Petersburg, both of Va.

[73] Assignee: Allied-Signal Inc., Morris Township, Morris County, N.J.

[21] Appl. No.: 292,863

[22] Filed: Jan. 3, 1989

[51] Int. Cl.$^5$ .............................................. C08G 63/02
[52] U.S. Cl. .................... 528/272; 528/289; 528/308.6; 528/323; 528/330; 525/437; 525/540; 264/176.1; 264/211.14
[58] Field of Search ............ 528/272, 289, 308.6, 528/323, 330; 264/176.1, 211.14; 525/437, 540

[56] References Cited

U.S. PATENT DOCUMENTS

| | | | |
|---|---|---|---|
| 3,141,006 | 7/1964 | Kohan | 528/314 |
| 4,016,142 | 4/1977 | Alexander et al. | 525/437 |
| 4,442,058 | 4/1984 | Griffith et al. | 264/176 R |
| 4,543,396 | 9/1985 | Arai et al. | 525/440 |

Primary Examiner—Morton Foelak
Assistant Examiner—S. A. Acquah

[57] ABSTRACT

An improved process for controlling and reducing the concentration of free carboxyl end groups in condensation polyester melt spun fiber is provided. The difunctional compound, serves to increase the intrinsic viscosity of the fiber. The process comprises admixing and reacting with molten polyester polymer an effective amount of a lactim compound of the formula

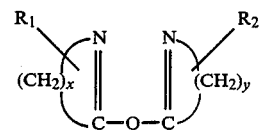

wherein
x and y may be alike or different and represent an integer of 2 to 15; and
$R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, or $C_6$–$C_{10}$ aromatic.

The lactim reacted polymer is then melt spun to form a fiber.

15 Claims, No Drawings

REDUCTION OF CARBOXYL END GROUPS IN POLYESTER WITH DILACTIM ETHERS

BACKGROUND OF THE INVENTION

1. Field of the Invention

This invention relates to the preparation of synthetic polyester filaments, yarns, and cords useful as industrial fibers which show improved strength retention when exposed to hydrolytic conditions or when sealed in a rubber and exposed to elevated temperatures. More particularly, the invention relates to a process whereby the free carboxyl end group concentration of synthetic polyesters may be reduced to a low level while producing yarns having good tensile properties.

2. Description of Related Art

Terephthalate polyesters such as those disclosed by U.S. Pat. No. 2,465,319 are produced in significant quantities for a variety of commercial products. Polyethylene terephthalate, one of the better known terephthalate polyesters, is a reaction product of terephthalic acid and ethylene glycol and is produced having a high degree of polymerization forming long linear polymer chains which normally terminate with either a carboxyl end group or a hydroxyl end group. The melt-spinning of high molecular weight polyethylene terephthalate has been successfully employed to produce fibers possessing properties suitable for use in reinforcing rubber articles including pneumatic tires.

In U.S. Pat. No. 3,051,212 to Daniels, it is disclosed that when rubber articles such as tires, belting, and the like are reinforced with fibers or cords comprising synthetic linear polyester, these fibers or cords show superior strength retention during exposure to high operating temperatures when the free carboxyl end group concentration of the polyester which comprises the cords is reduced to less than 15 milliequivalents per kilogram (meq/kg). It has also been observed that there appears to be a correlation between the resistance of linear polyesters of a given carboxyl end group concentration to high running temperatures in rubber and their resistance to hydrolytic conditions which may be encountered within hot rubber structures.

When structures having polyester reinforcing filaments with high carboxyl group concentration are exposed to high operating temperatures under hydrolytic conditions, excessive loss of strength is observed. This strength loss is particularly evident with polyester filaments used as reinforcing cords or fabrics in pneumatic tires which normally are expected to operate in a safe manner at high temperatures caused by high speeds and heavy loads.

Thus, low free carboxyl end group concentrations for polyester are highly desirable because it is believed to reduce degradation of the fiber. U.S. Pat. No. 4,016,142 to Alexander et al. discloses reducing the free carboxyl end groups by modifying the polyester with small amounts of a glycidyl ether which react with the carboxyl end groups present to form free hydroxy end groups. U.S. Pat. No. 4,442,058 to Griffith et al. discloses a method of reducing the number of free carboxyl end groups whereby minor amounts of a low-boiling oxirane compound such as ethylene oxide are added. U.S. Pat. No. 4,543,396 to Arai et al. discloses reaction of a bisoxazoline compound with the free carboxyl end groups.

U.S. application Ser. No. 161,553, filed Feb. 29, 1988, now U.S. Pat. No. 4,839,124, discloses reduction of carboxyl end groups in polyester with certain lactim ethers exemplified by 0,0'-butylene bis-caprolactim.

It is the object of this invention to provide an improved process for controlling and reducing the concentration of free carboxyl end groups in synthetic linear polyesters. A further object of this invention is to provide a process whereby a modified synthetic condensation polyester polymer of increased molecular weight may be obtained. Yet a further object of this invention is to provide a technique for producing high strength fibers, and provide for drawn yarn having high tensile properties.

As used herein synthetic polyesters mean film-forming or fiber-forming condensation products of dicarboxylic acids such as terephthalic acid and glycols of the series $HO(CH_2)_nOH$ where n is an integer from 2 to 10. An important example of this class of polyesters is polyethylene terephthalate which may be prepared by a number of well known processes. For use as reinforcing elements in rubber structures, melt-spun filaments of polyethylene terephthalate are drawn to about 3.5 to about 7.0 times their length after melt spinning, twisted into yarns and plied into cords or woven into fabrics. The cords or fabrics are then treated with adhesive and bonded against or into the rubber structures.

Synthetic linear polyester yarns or cords made by known means can be shown to contain a free carboxyl end group concentration of about 20 or more milliequivalents per kilogram (meq/kg). By "free carboxyl end groups" are meant the acid group,

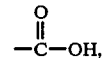

the concentration of which may be determined by Pohl's Method as described in Analytical Chemistry, Vol. 26, page 1614, October, 1954. The formation of such free carboxyl end groups, referred to hereinafter as "COOH", results as a natural consequence of the processes normally employed in the production of linear polyester polymers.

Known synthetic linear polyester yarns or cords for use as rubber structure reinforcing elements are preferably made from a polymer having an intrinsic viscosity of from 0.75 to 1.0 g/dl or higher. Whereas synthetic linear polyester filaments used in textile products normally have an intrinsic viscosity of the polymer of from 0.35 to 0.66 g/dl, these filaments are less suitable as rubber reinforcing elements since they are comparatively weak at a given extension level and fatigue to rupture with relatively little flexing. Filaments made from higher intrinsic viscosity synthetic linear polyester are stronger and less susceptible to such flexing fatigue. It has been found, however, that in the production of a polymer of a high intrinsic viscosity by the normal method of extending the polymerization period, an increase in free carboxyl group concentration results. Thus, while a high intrinsic viscosity polymer may be produced to overcome the problem of filament strength and flexing fatigue, at the same time the added carboxyl end group content results in an increase in the amount of strength lost when the filaments are exposed to high temperatures under hydrolytic conditions in rubber.

The carboxyl concentration is determined by dissolving the polyester in a 70/30 O-cresol/chloroform mixture and titrating the solution with 0.05N KOH in methanol. The end point is determined potentiometrically.

By the phrase "intrinsic viscosity", sometimes denominated IV, it is meant to describe the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\left[\frac{\text{Flow time of polymer solution}}{\text{Flow time of solvent}} - 1\right] \times \frac{1}{c}$$

where c is the concentration expressed as grams of polymer per 100 milliliter of solvent (g/dl). As used herein, the intrinsic viscosity was measured at 25° C., using a 60/40 mixture of phenol and tetrachloroethane as a solvent in a modified Ostwald viscometer.

SUMMARY OF THE INVENTION

This invention provides an improved process for controlling and reducing the concentration of free carboxyl end groups in linear condensation polyester melt spun fiber. In addition, the difunctional compound within the invention, makes it possible to increase the intrinsic viscosity of the fiber. The process comprises admixing and reacting with molten polyethylene terephthalate polymer an effective amount of a lactim compound of the formula

wherein
x and y may be alike or different and represent an integer of 2 to 15; and
$R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, or $C_6$–$C_{10}$ aromatic.

The lactim reacted polymer is then melt spun to form a fiber.

DESCRIPTION OF THE PREFERRED EMBODIMENT

The process of the invention pertains to melt spinning high molecular weight polyester polymer to produce fibers with reduced carboxyl end group concentration. The molten polyester polymer is admixed and reacted with an effective amount of a lactim compound of the formula

wherein
x and y may be alike or different and represent an integer of 2 to 15; and
$R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, $C_6$–$C_{10}$ aromatic.

The reacted molten polymer is forced under pressure to a spinneret and extruded into a zone of lower pressure and temperature to form a fiber.

These dilactim ethers may be prepared by known methods, such as condensation of two moles of a lactam of an ω-amino alkanoic acid with one mole of phosgene. Alternative methods lend the possibility of preparing mixed dilactim ethers, i.e. where x and y represent different integers. A discussion of such methods is found in U.S. Pat. No. 3,141,006 to Kohan, July 14, 1964 and incorporated herein by reference. It is possible that part or all of the dilactim ether may convert to a tautomeric structure, so that the term dilactim ether is meant to include not only the true dilactim ether structure but also the tautomeric form.

The dilactim ethers used in the present process may contain from 3 up to about 16 carbon atoms in each of the two heterocyclic rings (i.e., x and y in the foregoing formulas may be from 2 to about 15). However, based primarily on economic considerations and relative availability it is generally preferred to use dilactim ethers wherein each ring contains from 4 to 12 carbons, i.e., where x and y are integers from 3 to 11, inclusive. These dilactim ethers include:
Dibutrolactim ether
Divalerolactim ether
Dicaprolactim ether
Dienantholactim ether
Dicaprylolactim ether
Dipelargonolactim ether (or dinonanolactim ether)
Dicaprilactim ether (or didecanolactim ether)
Diun-(or dihen-)decanolactim ether, and
Dilaurolactim ether (or didodecanolactim ether) the names assigned being based on the common or I.U.C. names of the ω-amino-substituted alkanoic acids from which the dilactim ethers can be considered to be ultimately derived.

The dilactim compound reacts readily with molten polyethylene terephthalate polymer, with demonstrated advantages within as little as one minute reaction time. It would thus be advantageous to the process to extrude the molten polymer into fiber within a reasonable period after admixing with the lactim compound to minimize any thermal degradation that may result. The lactims are added in a sufficient amount to obtain desired results. A preferred range is 0.1 to 5.0 weight percent based on weight of the polymer, more preferably 0.1 to 2.0 weight percent, most preferably 0.1 to 1.0 weight percent.

The reactivity of the lactim compound with molten PET polymer can be modified by substitution of hydrogens in the parent lactam by appropriate groups such as halogen, nitro, amine, alkoxy, or aromatics. Thus in the general formula provided above $R_1$ and $R_2$ are intended to represent substitution for the hydrogens in the ring methylene groups $(CH_2)_{x \text{ or } y}$.

In the practice of this invention the lactim compound is permitted to react with the molten PET polymer. The lactim compound can be added directly to molten polymer or, alternatively, can be mixed with polymer chips prior to melting.

The lactim compound reacts with a carboxyl end group of PET to form a linkage with the polymer chain. The lactim may react with water to form a lactam. Thus it is thought that the reaction byproducts or products of hydrolysis for the lactim compound are innocuous materials such as lactam or lactam derivatives. This provides important environmental advantages regarding safety and handling.

With the difunctional lactim compounds of this invention it becomes possible to increase intrinsic viscosity by chain extension.

EXAMPLE 1

Preparation of di-ε-caprolactim-ether-dihydrochloride, 113 g. of ε-caprolactam is dissolved in 1.5 liters of benzene, after which 150 g. of phosgene is, over a period of 3 hours, passed into the solution with simultaneous stirring, the temperature of the solution being kept at 35°–50° C. Thereafter, stirring is continued for two hours, after which the precipitated dihydrochloride is separated off by filtration and washed with diethyl ether. 125 g. of di-ε-caprolactim-ether-dihydrochloride (melting point 119°–120° C.; yield 85%) is obtained.

The salt can be converted to dilactim ether by rapid addition of sodium hydroxide solution below 5° C., then extracted with ethyl ether. The ethyl ether extract is dried over anhydrous sodium sulfate. The crude dicaprolactim ether is purified by vacuum distillation (135°–145° C./1.2 mm Hg). The product is pure by gas chromatography.

EXAMPLE 2

In this experiment difunctional caprolactims are blended with molten polyester in a Brabender plastograph at a certain temperature. Samples are removed after a given reaction time and the changes in IV and free carboxyl end group concentration (COOH) are measured. The polyethylene terephthalate (PET) polymer to be used in this experiment can have an original IV of 0.95 g/dl and carboxyl content of 18 meq/kg. It is dried by a standard procedure (6 hours at 120° C. and 18 hours at 160° C., all under vacuum) and is immediately stored under dry nitrogen until use. The plastograph is turned on and allowed to reach the desired temperature (280° C. in this case). Fifty (50) grams of dried PET chips are poured into the plastograph at 30 rpm as rapidly as possible and are allowed to melt for two minutes. A preweighed quantity of the additives (0.25 gram for example) is put on the molten PET and is allowed to react with the polymer for a given time (1–10 minutes) after which the sample is removed rapidly and quenched in an ice water bath. The IV and carboxyl content of the samples are analyzed as described previously. For control PET, no additive is used, but after allowing the polymer to melt for 2 minutes, the polymer was allowed to remain in the plastograph for the same amount of time (1–10 minutes in this case) as the samples containing the additives before it is removed and quenched.

Comparing the COOH results, it will become apparent that the additives will be beneficial for reduction of the carboxyl as compared to the control which does not contain any additive. Dicaprolactim ethers will be good carboxyl scavengers and moreover the reactivity of the scavenger will be dependent on the nature of the R group attached to lactim moieties. It is important to realize that under the experimental conditions the carboxyl content of the control polymer relative to that of the original chip may increase due to thermal degradation and hydrolysis. We will therefore focus our attention to the relative change of carboxyl ($\Delta COOH = COOH_{control} - COOH_{sample}$) or change of IV ($\Delta IV = IV_{control} - IV_{sample}$) and not their absolute values.

Another important point to consider is the calculated percent efficiency which is based on observed ratio of molar changes of carboxyl content to the moles of additive used as defined below.

$$\% \text{ Efficiency} = \frac{\text{Decrease in No. equivalence COOH}}{\text{No. equivalence of additive used}} \times 100$$

Rearranging we obtain $$\% \text{ Efficiency} = \frac{-\Delta COOH \times MW_{additive}}{\% \text{ wt of additive} \times 200}$$

where $\Delta COOH$ is defined as above and units are meq/kg;

$MW_{additive}$ is the molecular weight of the additive;

% wt of additive is weight of additive per 100 g polyester.

One can potentially improve the efficiency either by modification of the chemical structure ($R_1$, $R_2$) or reaction conditions or addition of catalyst such as potassium iodide.

One can examine the extent of reaction of dicaprolactim ethers as a function of time at a given temperature (for example at 290° C.) in a Brabender Rheometer. One can measure rate and extent of carboxyl reduction by removal of sample at predetermined times and analyze for carboxyl content.

Dicaprolactim ethers are expected to tie the carboxyl end of the polyester and result in increase in molecular weight of the polymer. This will be reflected in the positive $\Delta IV$. The build up of the molecular weight will occur more gradually (as compared to rapid reduction of COOH) over time. Thus the dicaprolactim ethers not only reduces carboxyl content, but also will build up molecular weight and therefore should improve the strength of yarn produced from the polymer.

What is claimed:

1. A method of melt spinning high molecular weight polyester polymer to produce fibers with reduced carboxyl end group concentration comprising admixing and reacting with molten polyester polymer an effective amount of at least one lactim compound of the formula

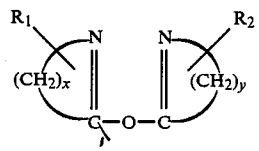

wherein x and y may be alike or different and represent an integer of 2 to 15 and $R_1$ and $R_2$ are independently hydrogen, halogen, nitro, amine, $C_1$–$C_{10}$ alkyl, $C_5$–$C_{12}$ cycloalkyl, $C_7$–$C_9$ alkyl aromatic, or $C_6$–$C_{10}$ aromatic;

forcing the reacted molten polymer under pressure to a spinneret;

and extruding the lactim reacted polymer into a zone of lower pressure and temperature to form a fiber.

2. The method of claim 1 wherein $R_1$ and $R_2$ are each hydrogen.

3. The method of claim 2 wherein 0.1 to 5.0 weight percent based on weight of the polymer of said lactim compound is admixed with said polymer.

4. The method of claim 2 wherein x and y are integers from 3 to 11.

5. The method of claim 4 wherein 0.1 to 5.0 weight percent based on weight of the polymer of said lactim compound is admixed with said polymer.

6. The method of claim 5 wherein 0.1 to 2.0 weight percent of said lactim compound is admixed with said polymer.

7. The method of claim 6 wherein 0.1 to 1.0 weight percent of said lactim compound is admixed with said polymer.

8. The method of claim 1 wherein said lactim is selected from the group consisting of
dibutyrolactim ether;
divalerolactim ether;
dicaprolactim ether;
dienantholactim ether; and
dicaprylolactim ether.

9. The method of claim 8 wherein 0.1 to 5.0 weight percent based on weight of the polymer of said lactim compound is admixed with said polymer.

10. The method of claim 9 wherein 0.1 to 2.0 weight percent of said lactim compound is admixed with said polymer.

11. The method of claim 10 wherein 0.1 to 1.0 weight percent of said lactim compound is admixed with said polymer.

12. The method of claim 8 wherein said lactim is dicaprolactim ether.

13. The method of claim 12 wherein 0.1 to 5.0 weight percent based on weight of the polymer of said lactim compound is admixed with said polymer.

14. The method of claim 13 wherein 0.1 to 2.0 weight percent of said lactim compound is admixed with said polymer.

15. The method of claim 14 wherein 0.1 to 1.0 weight percent of said lactim compound is admixed with said polymer.

* * * * *